(12) United States Patent
Takezawa

(10) Patent No.: US 6,646,690 B1
(45) Date of Patent: Nov. 11, 2003

(54) ARRANGEMENT OF λ/2 RETARDATION PLATE IN PROJECTOR

(75) Inventor: Takeshi Takezawa, Matsumoto (JP)

(73) Assignee: Seiko Epson Corporation, Tokyo (JP)

(*) Notice: Subject to any disclaimer, the term of this patent is extended or adjusted under 35 U.S.C. 154(b) by 119 days.

(21) Appl. No.: 09/619,573

(22) Filed: Jul. 19, 2000

(30) Foreign Application Priority Data

Jul. 23, 1999 (JP) .......................................... 11-209549
Apr. 27, 2000 (JP) ........................................ 2000-127549

(51) Int. Cl.[7] .......................................... G02F 1/1335
(52) U.S. Cl. ..................... 349/9; 349/5; 349/9; 349/117
(58) Field of Search ........................ 349/5, 9, 8, 117; 353/20, 94

(56) References Cited

U.S. PATENT DOCUMENTS 5,490,006 A * 2/1996 Masumoto et al. ......... 349/117
5,738,426 A * 4/1998 Daijogo et al. .............. 353/31
6,042,236 A * 3/2000 Hatakeyama et al. ........ 353/20
6,176,583 B1 * 1/2001 Sawai .......................... 353/20
6,224,217 B1 * 5/2001 Tanaka ......................... 353/94

FOREIGN PATENT DOCUMENTS

CN 1206120 A 1/1999
JP 10-186548 7/1998

* cited by examiner

Primary Examiner—Julie Ngo
(74) Attorney, Agent, or Firm—Oblon, Spivak, McClelland, Maier & Neustadt, P.C.

(57) ABSTRACT

A projector is provided with an illuminating optical system, a color-separating optical system that separates light into first through third beams of colored light, first through third electro-optical devices that modulate the first through third beams of colored light to generate first through third beams of modulated light, a color combiner that combines the first through third beams of modulated light to create a composite light, and a projecting optical system that project the composite light. The projector further includes a λ/2 retardation plate provided on at least one of an incident side and an exit side of the third electro-optical device. Each of the λ/2 retardation plates has a first face open to the atmosphere and a second face in contact with a transmissive member.

11 Claims, 16 Drawing Sheets

ARRANGEMENT OF λ/2 RETARDATION PLATE IN PROJECTOR

BACKGROUND OF THE INVENTION

1. Field of the Invention

This invention relates to a projector that projects and displays images.

2. Description of the Related Art

A projector usually comprises an illuminating optical system and liquid crystal panels for modulating light from the illuminating optical system responsive to image information (an image signal). The modulated light is then projected onto a screen by a projection lens.

FIG. 10 is an explanatory diagram showing the main part of a conventional projector. This projector comprises three liquid crystal light valves 900R, 900G and 900B, a cross-dichroic prism 920 and a projection lens 940. Colored light of the three colors red (R), green (G) and blue (B) emitted from an illuminating optical system (not shown) is caused to pass through the liquid crystal light valves 900R, 900G and 900B and thus modulated responsive to image information. The modulated light (modulated light beams) is combined by the cross-dichroic prism 920 and the composite light is projected by the projection lens 940. A color image is thus displayed upon the screen SC. Note that in FIG. 10, it is assumed that s-polarized colored light R, G and B is incident upon the liquid crystal light valves 900R, 900G and 900B.

The second liquid crystal light valve 900G comprises a liquid crystal panel 901G and polarizing plates 902Gi and 902Go at the incident and exit sides of the liquid crystal panel 901G, respectively. The polarization axes of the polarizing plates 902Gi and 902Go are set at right angles with each other. The incident side plate 902Gi transmits s-polarized light whereas the exit side plate 902Go transmits p-polarized light. With such a configuration, the s-polarized light incident on the second liquid crystal light valve 900G is converted to p-polarized light and then emitted.

The first liquid crystal light valve 900R comprises a liquid crystal panel 901R, a p-polarized light transmitting polarizing plate 902Ri, an s-polarized light transmitting polarizing plate 902Ro, and a λ/2 retardation plate 903R. The λ/2 retardation plate 903R is affixed to a glass plate 908, and the first polarizing plate 902Ri is affixed to the λ/2 retardation plate 903R. The s-polarized light incident on the glass plate 908 is converted to p-polarized light by the λ/2 retardation plate 903R, is transmitted through the p-polarized light transmitting polarizing plate 902Ri and is then converted to s-polarized light by the liquid crystal panel 901R and the s-polarized light transmitting polarizing plate 902Ro and emitted. The third liquid crystal light valve 900B has the same structure as the first light valve 900R.

The dichroic films of the cross-dichroic prism reflect s-polarized light more effectively than p-polarized light, and transmit p-polarized light more effectively than s-polarized light. Thus, the s-polarized light emitted from the first and third liquid crystal light valves 900R and 900B and the p-polarized light emitted from the second liquid crystal light valve 900G can be efficiently combined by the cross-dichroic prism 920.

In this Specification, the term "liquid crystal light valve" denotes a liquid crystal light valve in the broad sense, and it refers to a unit that comprises at least a liquid crystal panel and polarizing plates, and that may further comprises a λ/2 retardation plate. Note that a liquid crystal light valve in the narrow sense refers to a unit that includes a liquid crystal panel and polarizing plates and that does not include a λ/2 retardation plate.

The light illuminating the polarizing plate of the liquid crystal light valve generates heat to cause distortion of the polarizing plate occurs. Note that the amount of this distortion depends mainly on the intensity and distribution of the light which illuminates the polarizing plate.

In the aforementioned conventional projectors, the λ/2 retardation plates 903R and 903B contained in the first and third liquid crystal light valves 900R and 900B are sandwiched between the glass plate 908 and the polarizing plates 902Ri and 902Bi. For this reason, the distortion of the polarizing plate 902Ri causes distortion of the λ/2 retardation plate 903R.

FIG. 11 is a plan view of the polarizing plate 902Ri provided on the incident side of the first liquid crystal light valve 901R shown in FIG. 10 when viewed from the −x direction. Note that in the direction going back into the plane of the paper (the +x direction) from the polarizing plate 902Ri, the λ/2 retardation plate 903R and the glass plate 908 are disposed in this order. As shown by the broken lines in the figure, the heating of the polarizing plate 902Ri is normally relatively large near the center and relatively small in the periphery. In this case, the polarizing plate 902Ri becomes distorted in the directions indicated by arrows. At this time, when the polarizing plate 902Ri becomes distorted, the λ/2 retardation plate 903R sandwiched between the polarizing plate 902Ri and glass plate 908 also become distorted in the directions indicated by arrows. This phenomenon can occur in the same manner even in the case wherein the intensity distribution of the light beams illuminating the liquid crystal light valves is relatively uniform.

In the case wherein the λ/2 retardation plate 903R is distorted in this manner, the distorted portions of the λ/2 retardation plate 903R (FIG. 10) cannot efficiently convert the incident s-polarized light into p-polarized light. Thus, the intensity of the p-polarized light emitted from the p-polarized light transmitting polarizing plate 902Ri on the incident light becomes lower, and so does the intensity of s-polarized light emitted from the spolarized light transmitting polarizing plate 902Ro on the exit side. In this manner, nonuniformities occur in the brightness of the modulated light beam emitted from the liquid crystal light valve 900R. When such a modulated light beam is used to display a color image on the screen SC, chrominance nonuniformities occur within the displayed image.

SUMMARY OF THE INVENTION

An object of the present invention is thus to provide a technique for reducing chrominance nonuniformities in the images displayed by a projector.

At least part of the above and other objects of the present invention is attained by a projector for projecting and displaying a color image. The first projector comprises: an illuminating optical system that emits illuminating light; a color-separating optical system that separates the illuminating light emitted from the illuminating optical system into a first through third beam of colored light, each of which has one of three color components; first through third electro-optical devices that modulate the first through third beams of colored light separated by the color-separating optical system according to image information to form a first through third beam of modulated light; a color combiner that combines the first through third beams of modulated light by reflecting the first and third beams of modulated light while transmitting the second beam of modulated light; a projecting optical system that projects the composite light emitted from the color combiner; and a λ/2 retardation plate provided on at least one of an incident side and an exit side of both of the first and third electro-optical devices, the λ/2 retardation plate having a first surface open to the atmosphere and a second surface in contact with a transmissive member.

Since the λ/2 retardation plate is provided with one surface open to the atmosphere and its other surface in contact with a transmissive member, the distortion of the λ/2 retardation plate is reduced, and the chrominance nonuniformities in the images displayed are reduced accordingly.

In a preferred embodiment of the invention, a direction of polarization of the first and third beams of modulated light incident on the color combiner is a first direction of polarization, while a direction of polarization of the second beam of modulated light is a second direction of polarization perpendicular to the first direction.

In this arrangement, the color combiner can combine the first through third beams of modulated light effectively.

In a preferred embodiment of the invention, the illuminating optical system comprises: a polarized light generator for emitting the illuminating light as linearly polarized light having the first or second direction of polarization.

In this arrangement, the light incident on the first through third electro-optical devices has a uniform direction of polarization, and the light can be utilized effectively.

In a preferred embodiment of the invention, the λ/2 retardation plate is affixed to one surface of the transmissive member, and the electro-optical device includes a polarizing plate affixed to another surface of the transmissive member.

Although the λ/2 retardation plate and polarizing plate are provided on the same transmissive member in this arrangement, the distortion of the λ/2 retardation plate is reduced by the above stated mechanism and the chrominance nonuniformities are reduced in the images displayed.

In a preferred embodiment of the invention, the λ/2 retardation plate is affixed to one surface of the transmissive member, and the electro-optical device includes a polarizing plate affixed to a second transmissive member other than the transmissive member to which the λ/2 retardation plate is affixed.

In this arrangement also, the distortion of the λ/2 retardation plate is also reduced, and the chrominance nonuniformities are reduced in the images displayed.

Alternatively, the second projector comprises: an illuminating optical system that emits illuminating light; a color-separating optical system that separates the illuminating light emitted from the illuminating optical system into a first through third beam of colored light, each of which has one of three color components; first through third electro-optical devices that modulate the first through third beams of colored light separated by the color-separating optical system according to image information to form a first through third beam of modulated light; a color combiner that combines the first through third beams of modulated light by reflecting the first and third beams of modulated light while transmitting the second beam of modulated light; a projecting optical system that projects the composite light emitted from the color combiner; and a λ/2 retardation plate provided on at least one of an incident side and an exit side of the second electro-optical device, the λ/2 retardation plate having a first surface open to the atmosphere and a second surface in contact with a transmissive member.

This second projector has same function and advantage as the above first projector.

These and other objects, features, aspects, and advantages of the present invention will become more apparent from the following detailed description of the preferred embodiments with the accompanying drawings.

DESCRIPTION OF THE PREFERRED EMBODIMENTS

A. Embodiment 1

Figure 1:
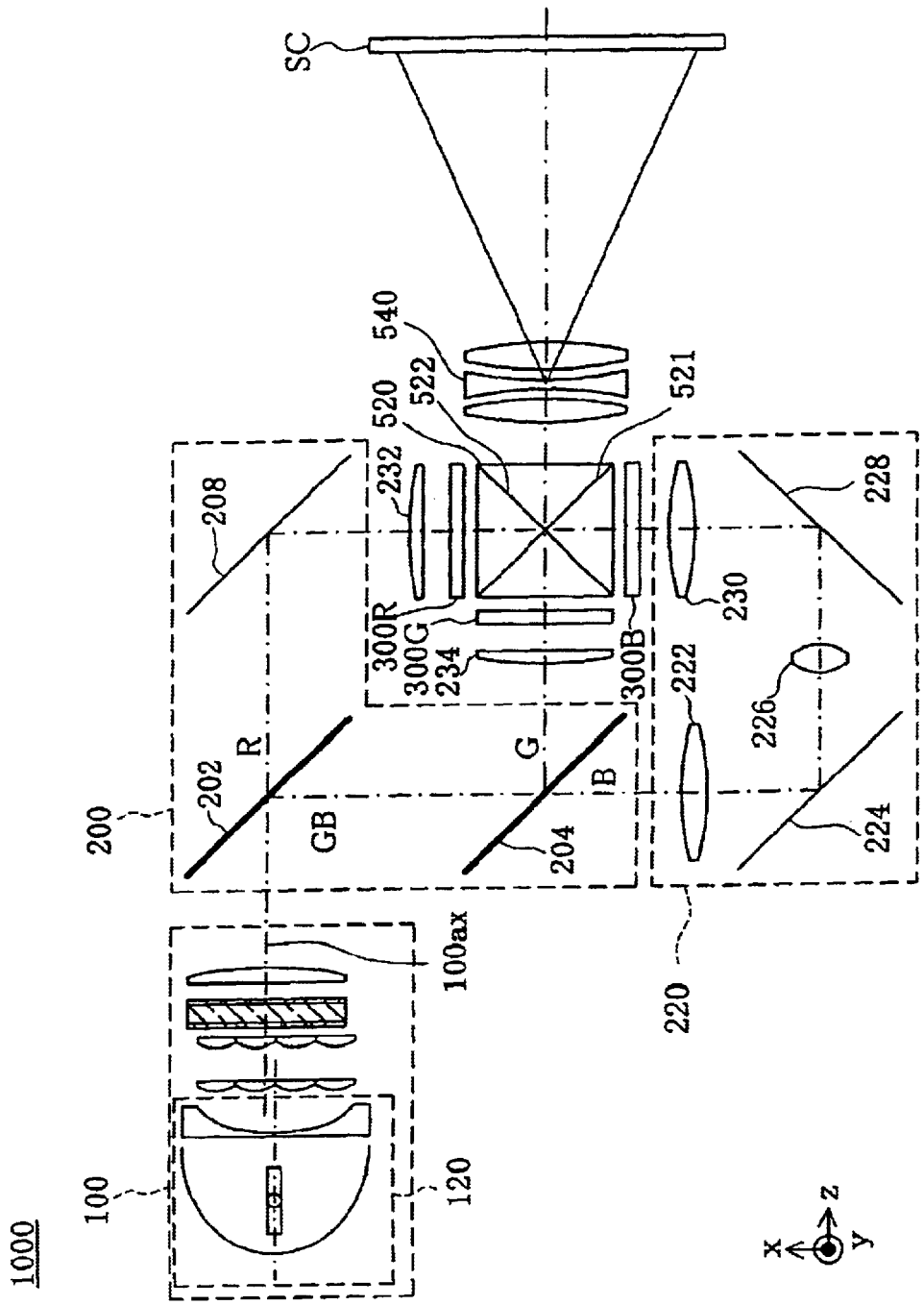
FIG. 1 is an explanatory diagram showing a projector to which the present invention is applied.

Here follows a description of the working of the present invention based on embodiments. FIG. 1 is an explanatory diagram showing a projector to which the present invention is applied. The projector 1000 comprises an illuminating optical system 100 with a light source 120, a color-separating optical system 200, a relay optical system 220, three liquid crystal light valves 300R, 300G and 300B, a cross-dichroic prism 520 and a projection lens 540.

Light emitted from the illuminating optical system 100 is separated into colored light of the three colors red (R), green (G) and blue (B) in the color-separating optical system 200. The light of each color is modulated responsive to image information by the liquid crystal light valves 300R, 300G and 300B, respectively. The modulated light of each color is combined by the cross-dichroic prism 520 and projected by the projection lens 540 onto the screen SC to display a color image.

Figure 2:
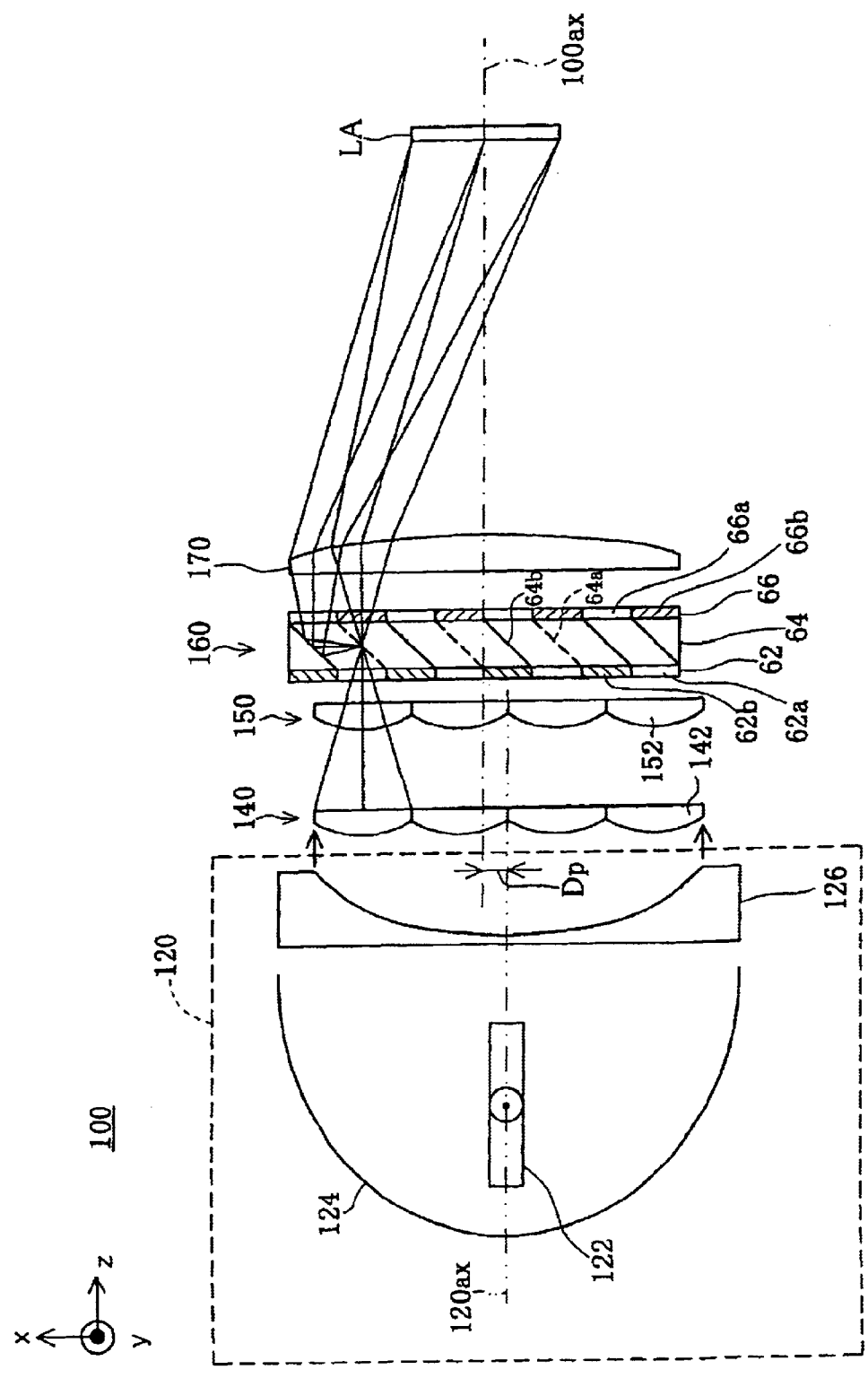
FIG. 2 is an explanatory diagram showing an enlargement of the illuminating optical system 100 of FIG. 1.

FIG. 2 is an explanatory diagram showing an enlargement of the illuminating optical system 100 of FIG. 1. This illuminating optical system 100 comprises a light source 120, a first and second lens array 140 and 150, a polarized light generating optical system 160 and a superimposition lens 170. The light source 120 and the first and second lens arrays 140 and 150 are disposed along the light source optical axis 120*ax* as a reference, while the polarized light generating optical system 160 and the superimposition lens 170 are disposed along the system optical axis 100*ax* as a reference. The light source optical axis 120*ax* lies along the central axis of the light beam emitted from the light source 120, while the system optical axis 100*ax* lies along the central axis of the light beam emitted from the optical elements in the stage after the polarized light generating optical system 160. As shown in the figure, the system optical axis 100*ax* and the light source optical axis 120*ax* are nearly parallel to each other but displaced by a predetermined displacement Dp in the x direction. This displacement Dp will be described later. Note that in FIG. 2, the illuminated area LA illuminated by the illuminating optical system 100 corresponds to the liquid crystal light valves 300R, 300G and 300B of FIG. 1.

The light source 120 emits a beam of nearly parallel light. The light source 120 comprises a light emitting tube 122, a reflector 124 with a convex surface in the shape of an ellipsoid of rotation and a parallelizing lens 126. The light emitted from the light emitting tube 122 is reflected by the reflector 124 and the reflected light is converted by the parallelizing lens 126 into light that is nearly parallel to the light source optical axis 120*ax*. Note that a reflector which has a convex surface in the shape of a paraboloid of rotation may also be used as the light source.

The first lens array 140 has a plurality of small lenses 142 arranged in a matrix. The small lenses 142 are planoconcave lenses whose external shape, when seen from the z direction, is set so that it is similar to that of the illuminated area LA (liquid crystal light valve). The first lens array 140 divides the nearly parallel light beam emitted from the light source 120 into a plurality of partial light beams which are emitted.

The second lens array 150 has a plurality of small lenses 152 arranged in a matrix, like the first lens array 140. The second lens array 150 aligns the central axes of each of the partial light beams emitted from the first lens array 140 so that they are nearly parallel to the system optical axis 100*ax*, and forms the images of each of the small lenses 142 of the first lens array 140 upon the illuminated area LA.

As shown in the figure, the partial light beams emitted from the small lenses 142 of the first lens array 140 pass through the second lens array 150 to be focused within the polarized light generating optical system 160.

Figure 3A:
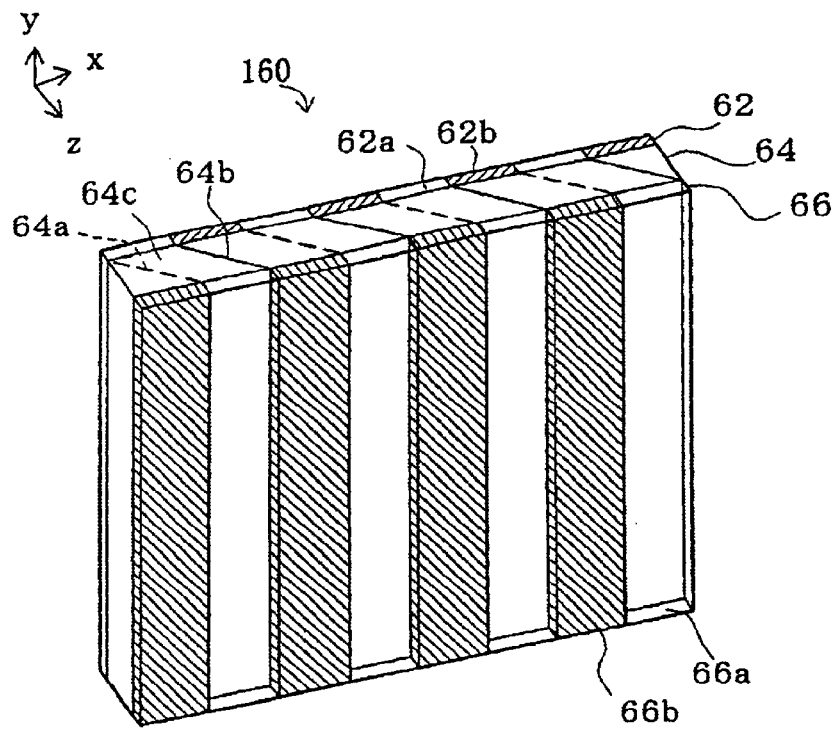
FIGS. 3(A), 3(B), and 3(C) are explanatory diagrams showing the polarized light generating optical system 160.
Figure 3B:
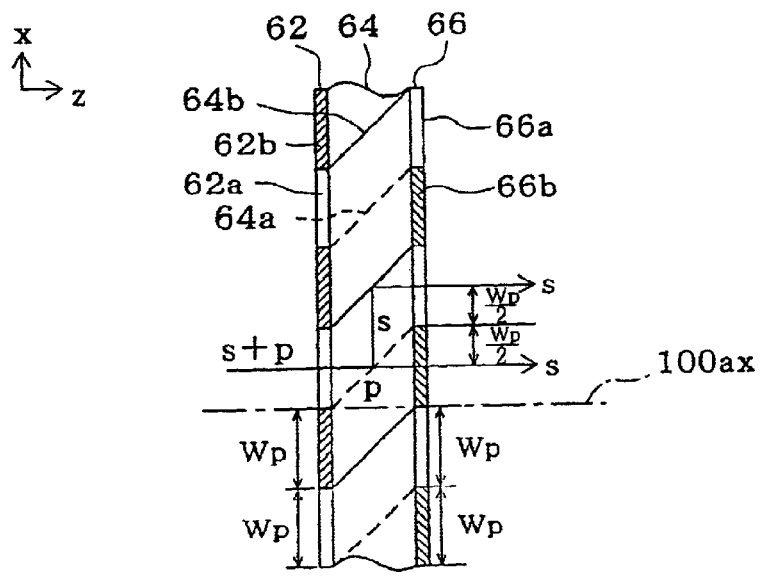

The polarized light generating optical system 160 correspond to the polarized light generator in the claimed invention. FIGS. 3(A) and 3(B) are explanatory diagrams showing the polarized light generating optical system 160. FIG. 3(A) is a perspective drawing showing the polarized light generating optical system 160, while FIG. 3(B) is a plan drawing showing a portion of it seen from the +y direction. The polarized light generating optical system 160 comprises a shading plate 62, a polarization beam splitter array 64 and a selective retardation plate 66.

As shown in FIG. 3(A), the polarization beam splitter array 64 contains a plurality of columnar transmissive members 64*c*, each having a section of parallelogram shape, which are adhered together. At the interface between each of the transmissive members 64*c* are formed polarized light separating films 64*a* and reflecting films 64*b* alternately. Note that multi-layer dielectric films are used as the polarized light separation films 64*a* while multi-layer dielectric films or metallic films are used as the reflecting films 64*b*.

The shading plate 62 comprises light-blocking surfaces 62*b* and open surfaces 62*a* disposed in alternating stripes. The shading plate 62 blocks the light beams entering the light-blocking surfaces 62*b* and transmits the light beams entering the open surfaces 62*a*. The light-blocking surfaces 62*b* and open surfaces 62*a* are arranged so that the partial light beams emitted from the first lens array 140 (FIG. 2) enter only at the polarized light separation films 64*a* of the polarization beam splitter array 64 and do not enter at the reflecting films 64*b*. Specifically, as shown in FIG. 3(B), the centers of the open surfaces 62*a* of the shading plate 62 are disposed such that they are roughly aligned with the centers of the polarized light separation films 64*a* of the polarization beam splitter array 64. In addition, the open width Wp of the open surfaces 62*a* in the x direction is set to be roughly equal to the size of the polarized light separation films 64*a* in the x direction. At this time, nearly all of the light beams transmitted through the open surfaces 62*a* of the shading plate 62 enter only the polarized light separation films 64*a* and do not enter the reflecting films 64*b*. Note that the shading plate 62 can be constructed as a flat plate-shaped transmissive member (for example, a glass plate) with light-blocking film (for example, a chromium film, aluminum film, multi-layer dielectric film, etc.) formed upon portions thereof. In addition, it is possible to use an aluminum plate or other light-blocking flat plate with apertures provided thereupon.

As indicated by the solid lines in FIG. 3(B), each of the partial light beams emitted from the first lens array 140 (FIG. 2) enters one of the open surfaces 62*a* in the shading plate 62 with its main optical axis (central axis) nearly parallel to the system optical axis 100*ax*. The partial light beams are transmitted through the open surfaces 62*a* and incident on the polarized light separation films 64*a*. The polarized light separation films 64*a* separate the partial light beams into s-polarized partial light beams and p-polarized partial light beams. The p-polarized partial light beams are transmitted through the polarized light separation films 64*a*, while the s-polarized partial light beams are reflected by the polarized light separation films 64*a*. The s-polarized partial light beams reflected by the polarized light separation films 64*a* head toward the reflecting films 64*b* and are further reflected by the reflecting films 64*b*. The p-polarized partial light beams transmitted through the polarized light separation films 64*a* and the s-polarized partial light beams reflected by the reflecting films 64*b* are nearly parallel to each other.

Figure 3C:
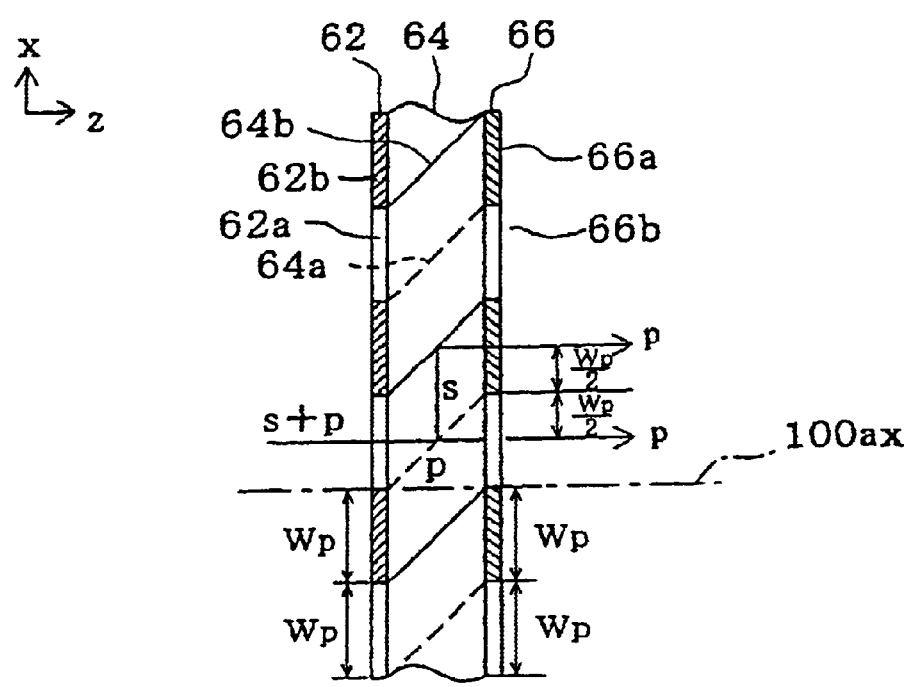

The selective retardation plate 66 comprises an open layer 66*a* and a λ/2 retardation layer 66*b*. Note that the open layer 66*a* is the portion upon which no λ/2 retardation layer 66*b* is formed. The open layer 66*a* functions to transmit incident linearly polarized light unaltered. On the other hand, the λ/2 retardation layer 66*b* functions as a polarization conversion element that converts linearly polarized light to another linearly polarized light having a direction of polarization perpendicular to its original direction. In this embodiment, as shown in FIG. 3(B), the p-polarized partial light beams that are transmitted through the polarized light separation films 64*a* enter the λ/2 retardation layer 66*b*. Therefore, the p-polarized partial light beams are converted to s-polarized partial light beams in the λ/2 retardation layer 66*b* and emitted. On the other hand, the s-polarized partial light beams reflected by the reflecting films 64*b* enter the open layer 66*a* so they are emitted unaltered as s-polarized partial light beams. To wit, non-polarized partial light beams that enter the polarized light generating optical system 160 are converted to s-polarized partial light beams and emitted. Note that by disposing a λ/2 retardation layer 66*b* on only the surfaces where the s-polarized partial light beams reflected by the reflecting films 64b are emitted, it is possible to convert the partial light beams that enter the polarized light generating optical system 160 into p-polarized partial light beams which are emitted (see FIG. 3(C)). As the selective retardation plate 66, it is possible to provide nothing in the open layer 66a portion and simply affix the λ/2 retardation layer 66b to the surfaces where the p-polarized partial light beams or s-polarized partial light beams are emitted.

As is evident from FIG. 3(B), the centers of the two s-polarized light beams emitted from the polarized light generating optical system 160 are displaced from the center of the incident non-polarized light (s-polarized light+p-polarized light) in the +x direction. The amount of this displacement is equal to one-half of the width Wp of the λ/2 retardation layer 66b (namely the size of the polarized light separation films 64a in the x direction). For this reason, as shown in FIG. 2, the light source optical axis 120ax and the system optical axis 100ax are displaced by a distance Dp equal to Wp/2.

As described above, the plurality of partial light beams emitted from the first lens array 140 are separated by the polarized light generating optical system 160 into two partial light beams from each partial light beam, and also each is converted nearly completely into one type of linearly polarized light having a predetermined direction of polarization. The plurality of partial light beams with the predetermined direction of polarization are superimposed upon the illuminated area LA by means of the superimposition lens 170 shown in FIG. 2. The intensity distribution of the light illuminating the illuminated area LA becomes nearly uniform.

The illuminating optical system 100 (FIG. 1) emits illuminating light (s-polarized light) with a predetermined direction of polarization, thus illuminating the liquid crystal light valves 300R, 300G and 300B with the aid of the color-separating optical system 200 and relay optical system 220.

The color-separating optical system 200 comprises two dichroic mirrors 202 and 204 and a full reflection mirror 208, separating the light beam emitted from the illuminating optical system 100 into colored light of the three colors red, green and blue. The first dichroic mirror 202 transmits the red component of the light emitted from the illuminating optical system 100 but reflects the blue and green components. The red light R transmitted by the first dichroic mirror 202 is reflected by the full reflection mirror 208 to head toward the cross-dichroic prism 520. The red light R emitted from the color-separating optical system 200 passes through a field lens 232 and reaches the red light liquid crystal light valve 300R. This field lens 232 converts the various partial light beams emitted from the illuminating optical system 100 into light beams that are parallel to its central axis. Note that the other field lenses 234 and 230 provided on the incident light sides of the other liquid crystal light valves 300G and 300B function similarly.

Among the blue light B and green light G reflected by the first dichroic mirror 202, the green light G is reflected by the second dichroic mirror 204 to head toward the cross-dichroic prism 520. The green light emitted from the color-separating optical system 200 passes through a field lens 234 and reaches the green light liquid crystal light valve 300G. On the other hand, the blue light B transmitted through the second dichroic mirror 204 enters the relay optical system 220.

The blue light B that enters the relay optical system 220 passes through an entrance-side lens 222, relay lens 226, full reflection mirrors 224 and 228 and an exit-side lens 230 (field lens) to reach the blue light liquid crystal light valve 300B. Note that the reason why the relay optical system 220 is used for the blue light B is so that the length of the optical path for the blue light B is longer than that of the other colors R and G, so by using a relay optical system 220, the blue light B entering the entrance-side lens 222 can be transmitted to the exit-side lens 230 unaltered.

The three liquid crystal light valves 300R, 300G and 300B modulate the three colors of light that enter them according to given image information (image signal), thereby generating modulated light beams. Each liquid crystal light valve comprises a liquid crystal panel and polarizing plates disposed on its incident side and the exit side. Note that details of the liquid crystal light valves are to be described later.

The cross-dichroic prism 520 combines the three colors of light (modulated light beams) modulated by the liquid crystal light valves 300R, 300G and 300B to generate composite light which represents a color image. The cross-dichroic prism 520 includes a red light-reflecting film 521 and a blue light-reflecting film 522 which are formed in an X shape on the interfaces among four rectangular prisms. The red light-reflecting film 521 is formed from a multi-layer dielectric film that reflects red light, while the blue light-reflecting film 522 is formed from a multi-layer dielectric film that reflects blue light. With the red light-reflecting film 521 and blue light-reflecting film 522, the three colors of light are combined to produce composite light that represents a color image.

The composite light generated by the cross-dichroic prism 520 is emitted in the direction of the projection lens 540. The projection lens 540 projects the composite light upon the screen SC to display a color image. Note that a telecentric lens can be used as the projection lens 540.

Figure 4:
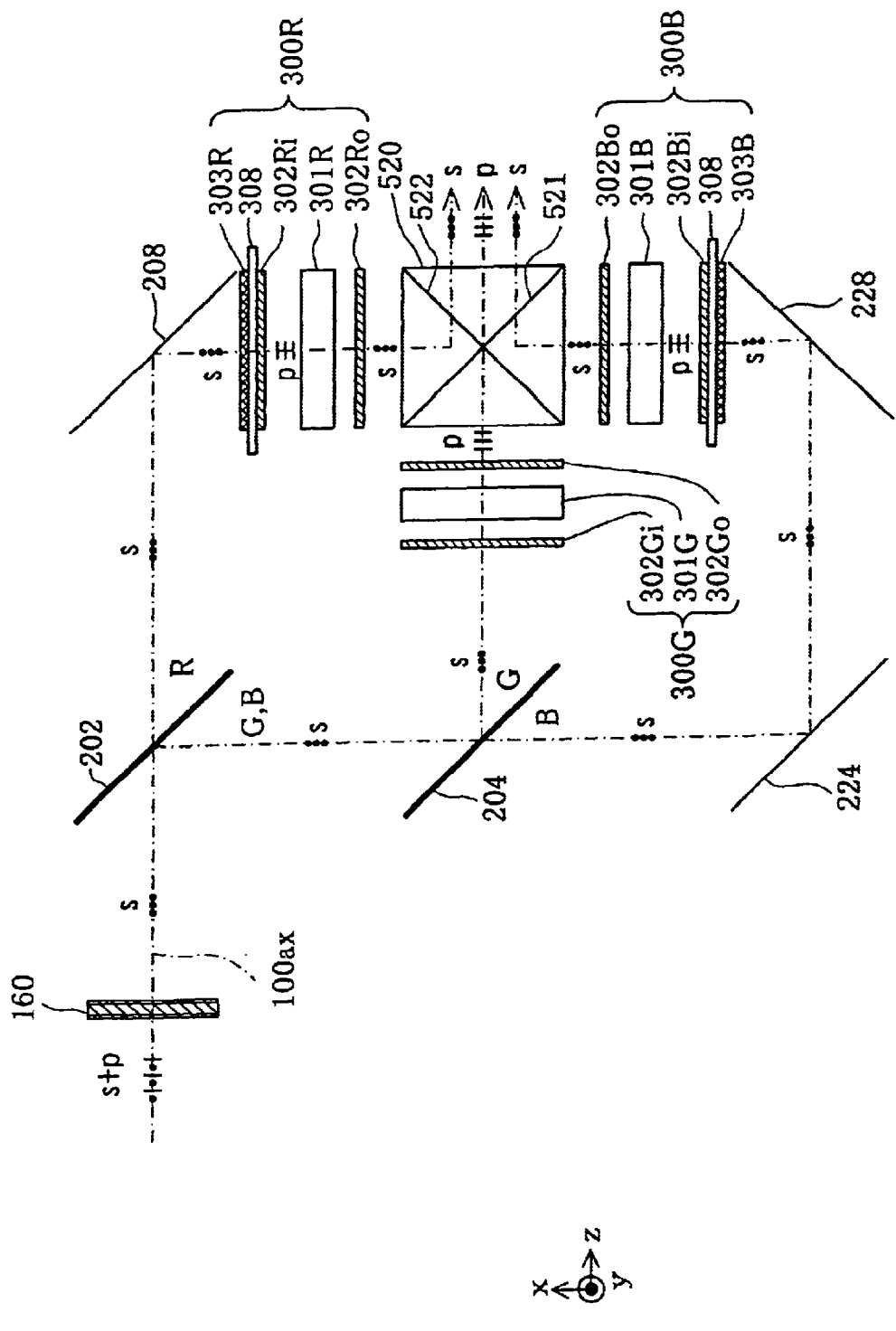
FIG. 4 is an explanatory diagram showing the main part of the projector 1000 of FIG. 1.

FIG. 4 is an explanatory diagram showing the main part of the projector 1000 of FIG. 1. Note that in FIG. 4, the optical system from the polarized light generating optical system 160 to the cross-dichroic prism 520 in FIG. 1 is drawn with emphasis on the direction of polarization. Optical elements that have nearly nothing to do with the direction of polarization (lenses, etc.) are omitted from the drawing. Note that embodiment 2 and the other embodiments to be described later are also shown in the same manner.

In embodiment 1, as described in FIG. 2, the polarized light generating optical system 160 emits s-polarized light. As described previously, s-polarized light is separated by the two dichroic mirrors 202 and 204 into red light R, green light G and blue light B. The direction of polarization is unchanged by transmission through the dichroic mirrors 202 and 204, so the three colors of light remain s-polarized light.

Figure 10:
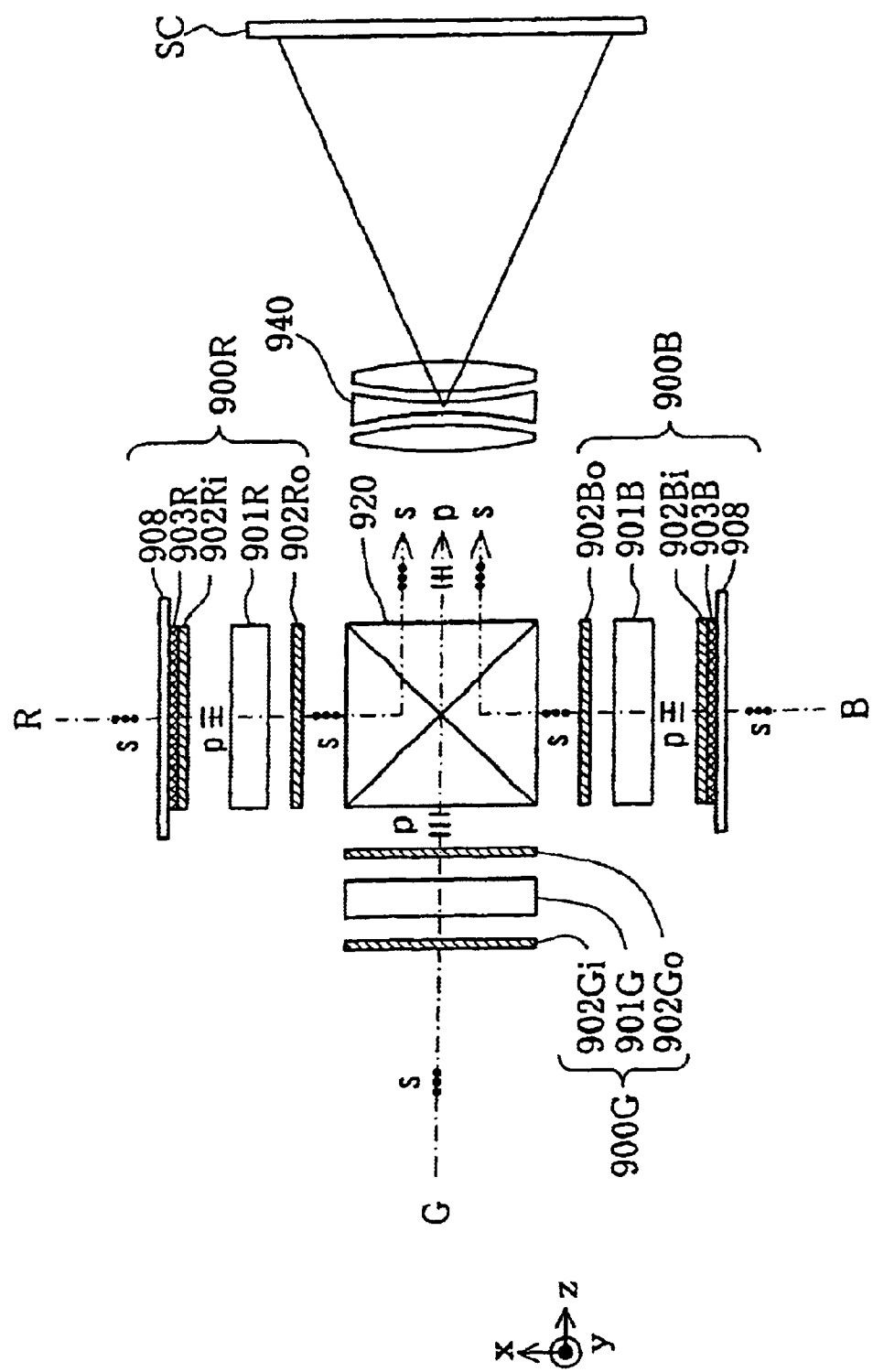
FIG. 10 is an explanatory diagram showing the main part of a conventional projector.
Figure 11:
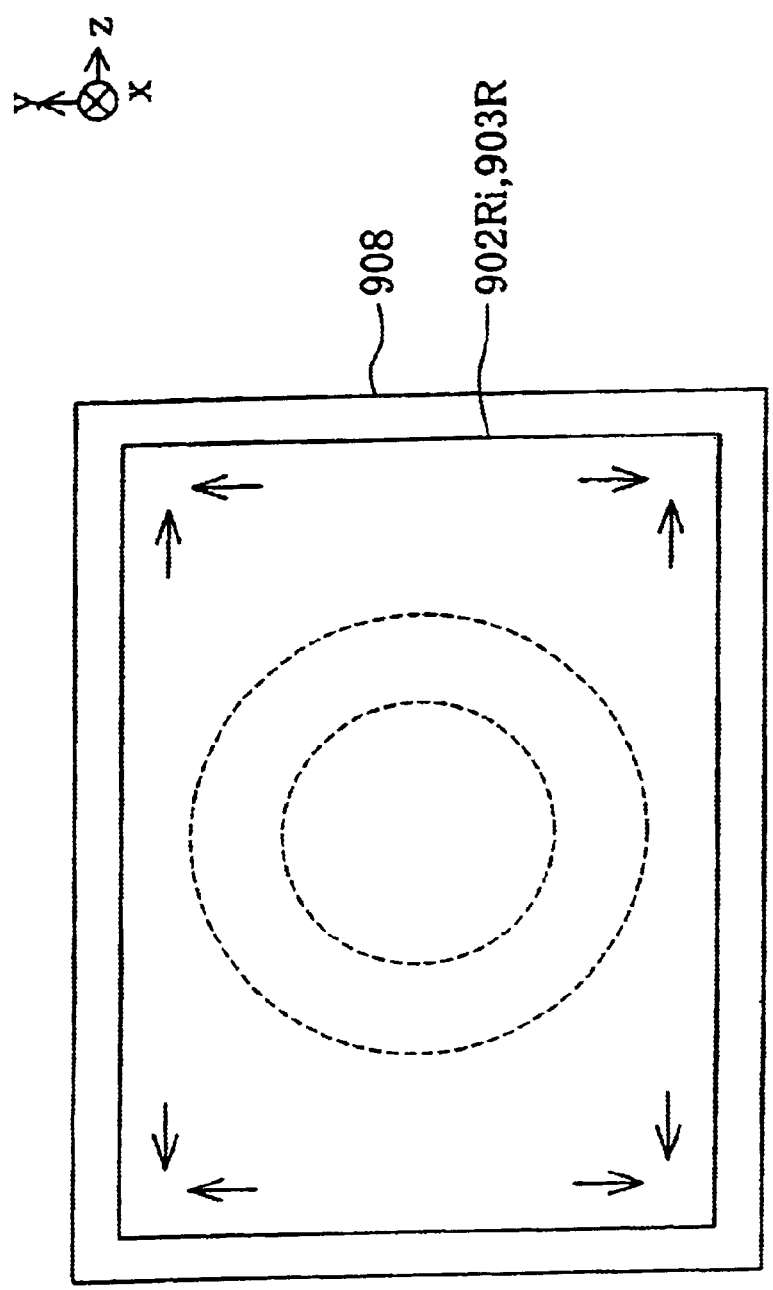
FIG. 11 is a plan view of the polarizing plate 902Ri provided on the incident light side of the first liquid crystal light valve 900R shown in FIG. 10 when viewed from the −x direction.

The s-polarized red light R separated by the first dichroic mirror 202 is reflected by the full reflection mirror 208 and enters the first liquid crystal light valve 300R. The liquid crystal light valve 300R comprises a liquid crystal panel 301R and two polarizing plates 302Ri and 302Ro provided on its incident side and exit side, respectively. In addition, a λ/2 retardation plate 303R is provided on the incident side of the liquid crystal panel 301R. The axes of polarization of the first and second polarizing plates 302Ri and 302Ro are set perpendicular to each other, so the first polarizing plate 302Ri is a p-polarized light transmitting polarizing plate which transmits p-polarized light and the second polarizing plate 302Ro is an s-polarized light transmitting polarizing plate which transmits s-polarized light. In this manner, the liquid crystal light valve 300R is provided with a λ/2 retardation plate 303R and two polarizing plates 302Ri and 302Ro like the liquid crystal light valve 900R shown in FIG. 10. However, where the λ/2 retardation plate 903R is sandwiched between the glass plate 908 and polarizing plate 902Ri in the conventional projector shown in FIG. 10, in the projector of this embodiment, the λ/2 retardation plate 303R is provided with one surface open to the atmosphere and its other surface in contact with a transmissive glass plate 308 that does not change the direction of polarization. Specifically, the λ/2 retardation plate 303R is affixed to one surface of the glass plate 308 and polarizing plate 302Ri is affixed to the other surface. The distortion of the λ/2 retardation plate 303R due to that of the polarizing plate 302Ri is reduced. Note that in FIG. 4, the polarizing plate 302Ro on the exit side is provided independently, but it can also be affixed to the exit side of the liquid crystal panel 301R or to the incident side of the cross-dichroic prism 520.

The s-polarized light incident on the first liquid crystal light valve 300R is converted to p-polarized light by the λ/2 retardation plate 303R. This p-polarized light is transmitted unaltered through the polarizing plate 302Ri and is modulated by the liquid crystal panel 301R and thereby, a portion of the light is converted to s-polarized light, and only the s-polarized light is emitted from the polarizing plate 302Ro.

The s-polarized green light G separated by the second dichroic mirror 204 enters the second liquid crystal light valve 300G. The second liquid crystal light valve 300G comprises a liquid crystal panel 301G, an s-polarized light transmitting polarizing plate 302Gi provided on the incident light side of the liquid crystal panel 301G and a p-polarized light transmitting polarizing plate 302Go provided on the light exit side. The s-polarized green light G entering the second liquid crystal light valve 300G is transmitted unaltered through the polarizing plate 302Gi and is modulated by the liquid crystal panel 301G and thereby, a portion of the light is converted to p-polarized light, and only the p-polarized light is emitted from the polarizing plate 302Go.

The s-polarized blue light B separated by the second dichroic mirror 204 is reflected by the full reflection mirrors 224 and 228 and enters the third liquid crystal light valve 300B. The third liquid crystal light valve 300B comprises a liquid crystal panel 301B, two polarizing plates 302Bi and 302Bo, a λ/2 retardation plate 303B, and a glass plate 308 to which the λ/2 retardation plate 303B and polarizing plate 302Bi are affixed. Note that the third liquid crystal light valve 300B is similar to the first liquid crystal light valve 300R, so we shall omit a detailed explanation thereof.

The reason why this embodiment is set up such that the first and third liquid crystal light valves 300R and 300B emit s-polarized light and the second liquid crystal light valve 300G emits p-polarized light is so that the light can be efficiently combined in the cross-dichroic prism 520. To wit, as described above, the cross-dichroic prism 520 includes a red light-reflecting film 521 and a blue light-reflecting film 522 which are formed in an X shape. These reflecting films 521 and 522 normally have excellent reflection characteristics with respect to s-polarized light. For this reason, the light to be reflected by these two reflecting films 521 and 522 is made to be s-polarized light and the light to be transmitted through the two reflecting films 521 and 522 is made to be p-polarized light. Thereby, nearly all of the s-polarized red light modulated by the first liquid crystal light valve 300R is reflected by the red light-reflecting film 521 and nearly all of the p-polarized red light modulated by the third liquid crystal light valve 300B is reflected by the blue light-reflecting film 522. In addition, nearly all of the p-polarized green light modulated by the second liquid crystal light valve 300G is transmitted by the red light-reflecting film 521 and blue light-reflecting film 522. Therefore, the cross-dichroic prism 520 can efficiently combine the various beams of polarized light emitted from the three liquid crystal light valves 300R, 300G and 300B. Note that in FIG. 4, for simplicity in drawing the positions at which the green light and blue light are reflected are drawn at positions shifted from the two reflecting films 521 and 522.

As described above, in the projector of this embodiment, the λ/2 retardation plates 303R and 303B are provided with one surface open to the atmosphere and their other surface in contact with a transmissive glass plate 308 that does not change the direction of polarization. Accordingly, even if the polarizing plates 302Ri and 302Bi are distorted by heat, the λ/2 retardation plates 303R and 303B will not distorted so much. The λ/2 retardation plates 303R and 303B are able to convert the incident s-polarized light readily into p-polarized light, so the intensity of the p-polarized light emitted from the polarizing plates 302Ri and 302Bi on the incident light side and the intensity of the s-polarized light emitted from the polarizing plates 302Ro and 302Bo on the light exit side is not reduced compared to that of the conventional projector of FIG. 10. As a result, it is possible to reduce the chrominance nonuniformities in the color image displayed on the screen SC (FIG. 1) by combining the modulated light beams emitted from the three liquid crystal light valves 300R, 300G and 300B.

Note that as is clear from the above explanation, the first through third liquid crystal light valves 300R, 300G and 300B in this embodiment correspond to the first through third electro-optical devices of the claimed invention except for the λ/2 retardation plates 303R and 303B. In other words, the projector of this embodiment has the first through third electro-optical devices of the claimed invention, and additionally λ/2 retardation plates on the incident light sides. Note that the term "electro-optical device" is typically used in the narrow sense of an electro-optical device meaning the liquid crystal panel alone, but in this Specification, it refers to an electro-optical device in the broad sense of including the liquid crystal panel and polarizing plates. In addition, the s-polarized light emitted from the first and third liquid crystal light valves 300R and 300B correspond to the first and third beams of modulated light having a first direction of polarization in the claimed invention, and the p-polarized light emitted from the second liquid crystal light valve 300G corresponds to the second beam of modulated light having a second direction of polarization in the claimed invention.

B. Embodiment 2

Figure 5:
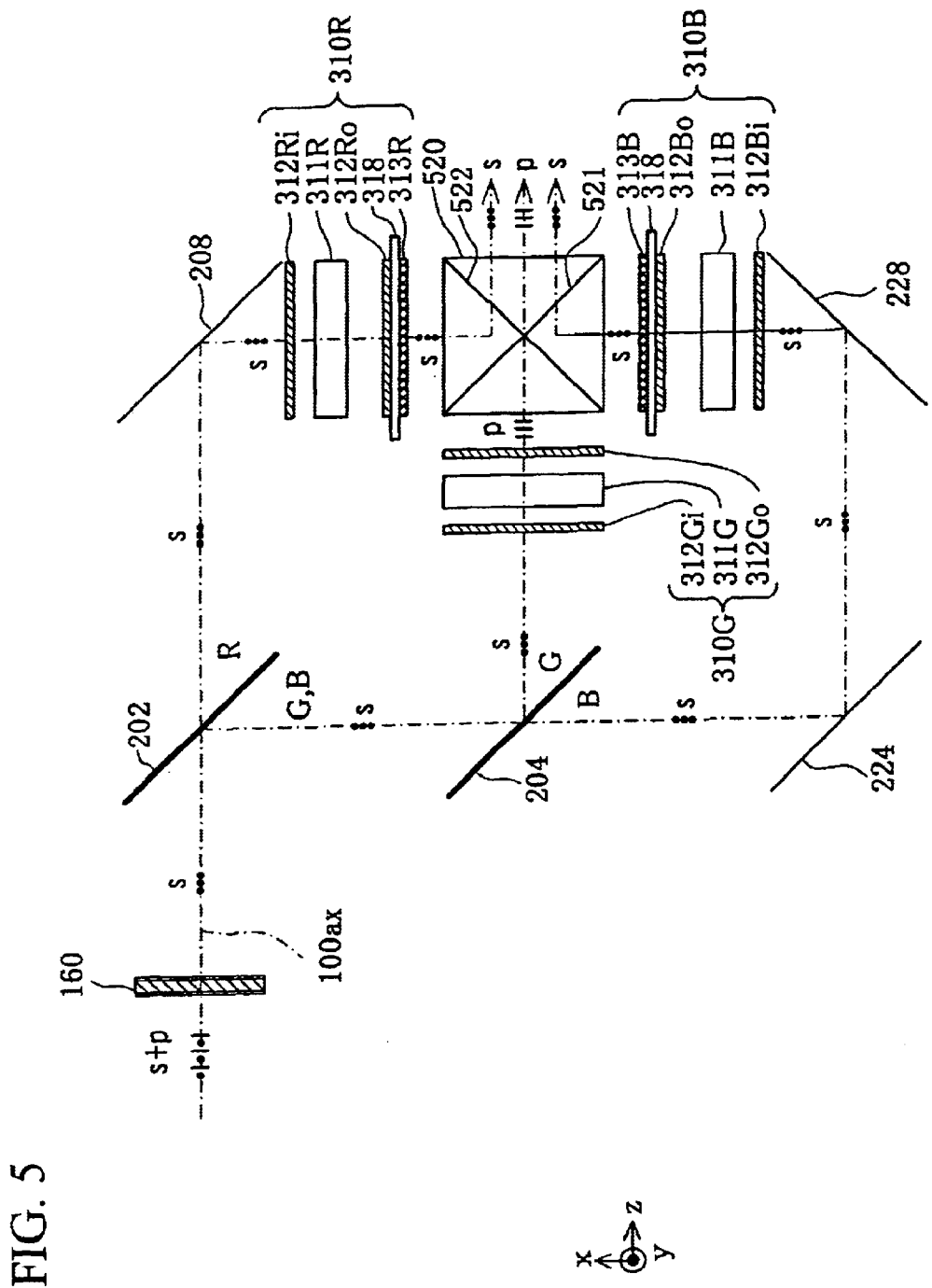
FIG. 5 is an explanatory diagram showing the main part of embodiment 2.

FIG. 5 is an explanatory diagram showing the main part of embodiment 2. In embodiment 1 (FIG. 4), the λ/2 retardation plates 303R and 303B are provided on the incident light side of the liquid crystal light valves 300R and 300B, but in embodiment 2, the λ/2 retardation plates 313R and 313B are provided on the light exit side of the liquid crystal light valves 310R and 310B. However, with the liquid crystal light valves 310R and 310B in embodiment 2, s-polarized light transmitting polarizing plates 312Ri and 312Bi are provided on the incident light side while p-polarized light transmitting polarizing plates 312Ro and 312Bo are provided on the light exit side.

In the first liquid crystal light valve 310R, s-polarized red light is transmitted through the polarizing plate 312Ri unaltered and enters liquid crystal panel 311R. The liquid crystal panel 311R converts a portion of the incident s-polarized light into p-polarized light and only the p-polarized light is emitted from the p-polarized light transmitting polarizing plate 312Ro disposed on the light exit side. The p-polarized light emitted from the polarizing plate 312Ro passes through the glass plate 318, enters the λ/2 retardation plate 313R, is converted to s-polarized light and emitted. The same goes for the third liquid crystal light valve 310B. In addition, the other constituent elements are identical to those of embodiment 1, so we shall omit a detailed explanation thereof.

In the projector of embodiment 2 also, the λ/2 retardation plates 313R and 313B are provided with one surface open to the atmosphere and their other surface in contact with a transmissive glass plate 318 that does not change the direction of polarization. Therefore, the distortion of the λ/2 retardation plates 313R and 313B due to that of the polarizing plates 312Ri and 312Bi can be reduced. As a result, the chrominance nonuniformities will be reduced in the displayed color image.

In contrast to the case of embodiment 1, in this embodiment it is possible to provide all s-polarized light transmitting polarizing plates 312Ri, 312Gi and 312Bi on the incident light sides of the three liquid crystal light valves 310R, 310G and 310B, and it is possible to provide all p-polarized light transmitting polarizing plates 312Ro, 312Go and 312Bo on the light exit sides. In this case, it is possible to design the orientation of the liquid crystals of the liquid crystal panels 311R, 311G and 311B identically. Therefore, in embodiment 2, the three liquid crystal light valves can be given a common design except for the λ/2 retardation plates so it is possible to reduce the number of types of parts.

Note that the projector in this embodiment correspond to the first and third electro-optical devices of the claimed invention with λ/2 retardation plates provided on the light exit side.

C. Embodiment 3

Figure 6:
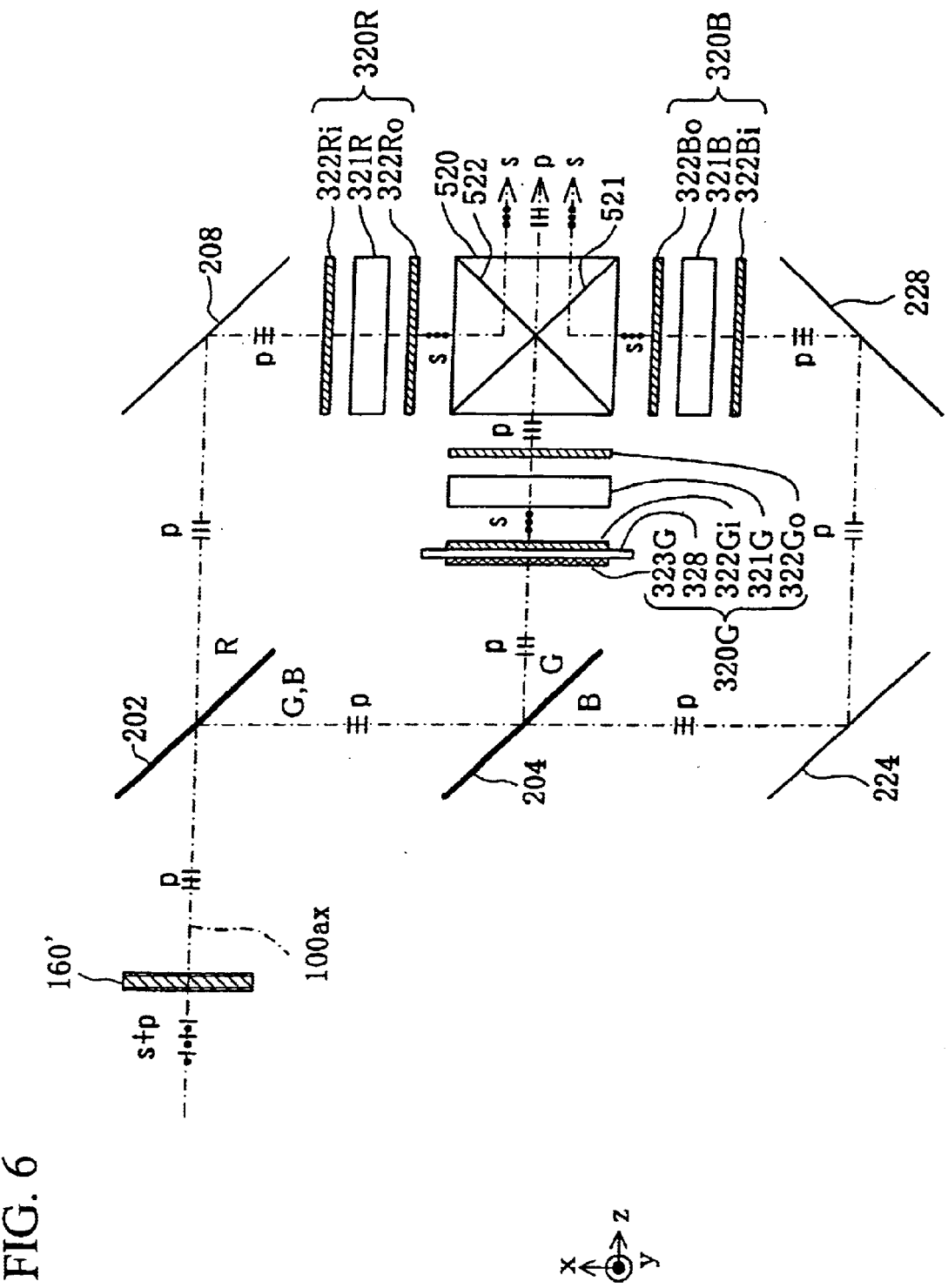
FIG. 6 is an explanatory diagram showing the main part of embodiment 3.
Figure 6A:
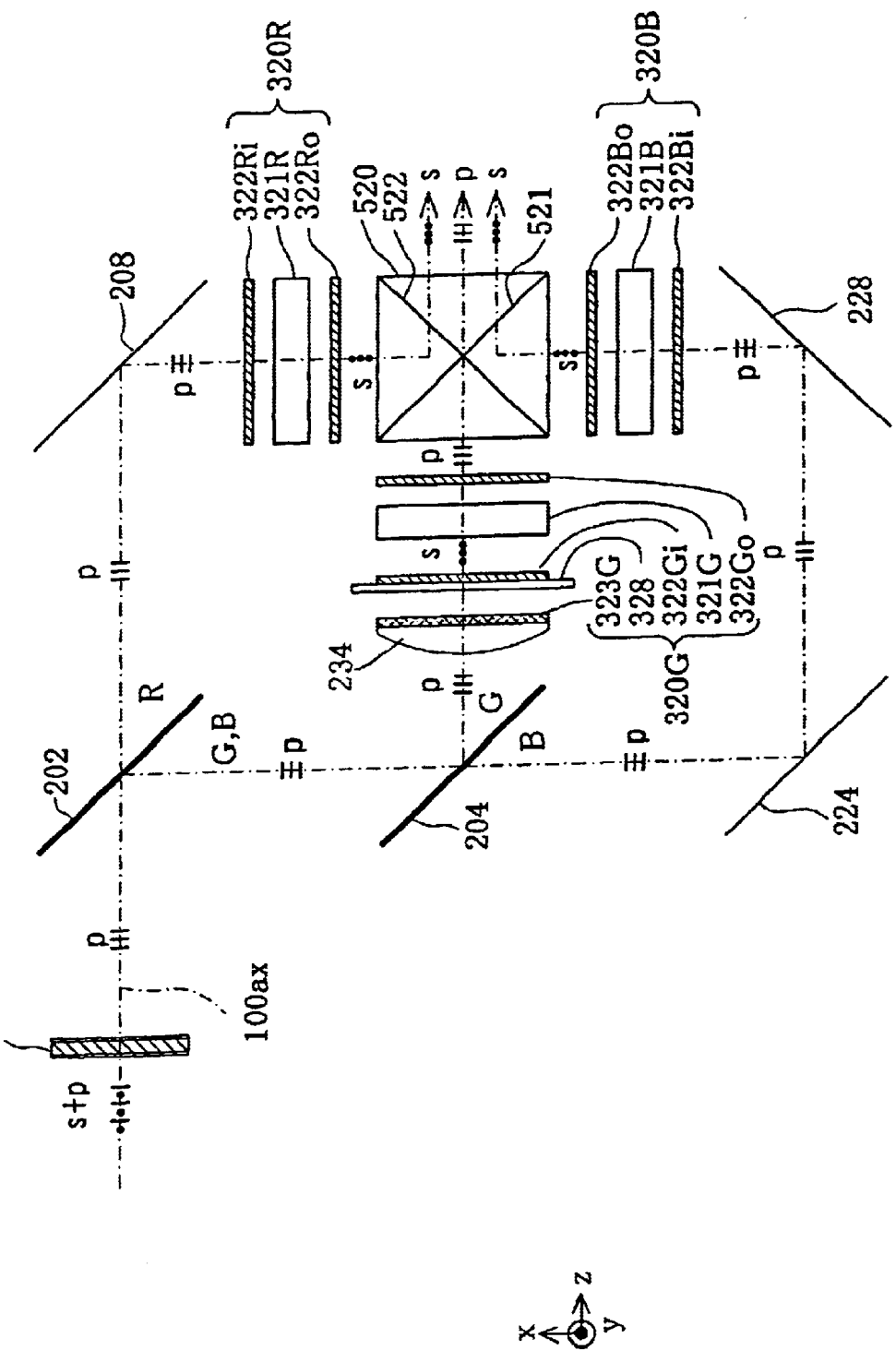
FIG. 6(A) is an explanatory diagram showing an alternate aspect of embodiment 3.

FIG. 6 is an explanatory diagram showing the main part of embodiment 3. Embodiment 3 has the structure where the polarized light generating optical system 160 of embodiment 1 (FIG. 4) is replaced with a polarized light generating optical system 160' that emits p-polarized light. In embodiment 1 (FIG. 4), the λ/2 retardation plates 303R and 303B are provided on the incident light side of the liquid crystal light valves 300R and 300B, but in embodiment 3, a λ/2 retardation plate 323G is provided only on the incident light side of the liquid crystal light valve 320G. The other constituent elements are identical to those of embodiment 1. To wit, p-polarized light transmitting polarizing plates 322Ri and 322Bi are provided on the incident light sides of the first and third liquid crystal light valves 320R and 320B and s-polarized light transmitting polarizing plates 322Ro and 322Bo are provided on their light exit sides. In addition, an s-polarized light transmitting polarizing plate 322Gi is provided on the incident light side of the second liquid crystal light valve 320G and a p-polarized light transmitting polarizing plate 322Go is provided on its light exit side.

In embodiment 3 also, as shown in FIG. 6, the λ/2 retardation plate 323G is provided with one surface open to the atmosphere and its other surface in contact with a transmissive glass plate 328 that does not change the direction of polarization. Therefore, the distortion of the λ/2 retardation plate 323G due to that of the polarizing plate 322Gi can be reduced. As a result, the chrominance non-uniformities will be reduced in the displayed color image.

In contrast to the case of embodiment 1, in this embodiment only one λ/2 retardation plate 323G is provided, so it has an advantage of being able to reduce the number of parts.

Note that the projector in this embodiment corresponds to the second electro-optical device of the claimed invention with a λ/2 retardation plate provided on the incident light side.

D. Embodiment 4

Figure 7:
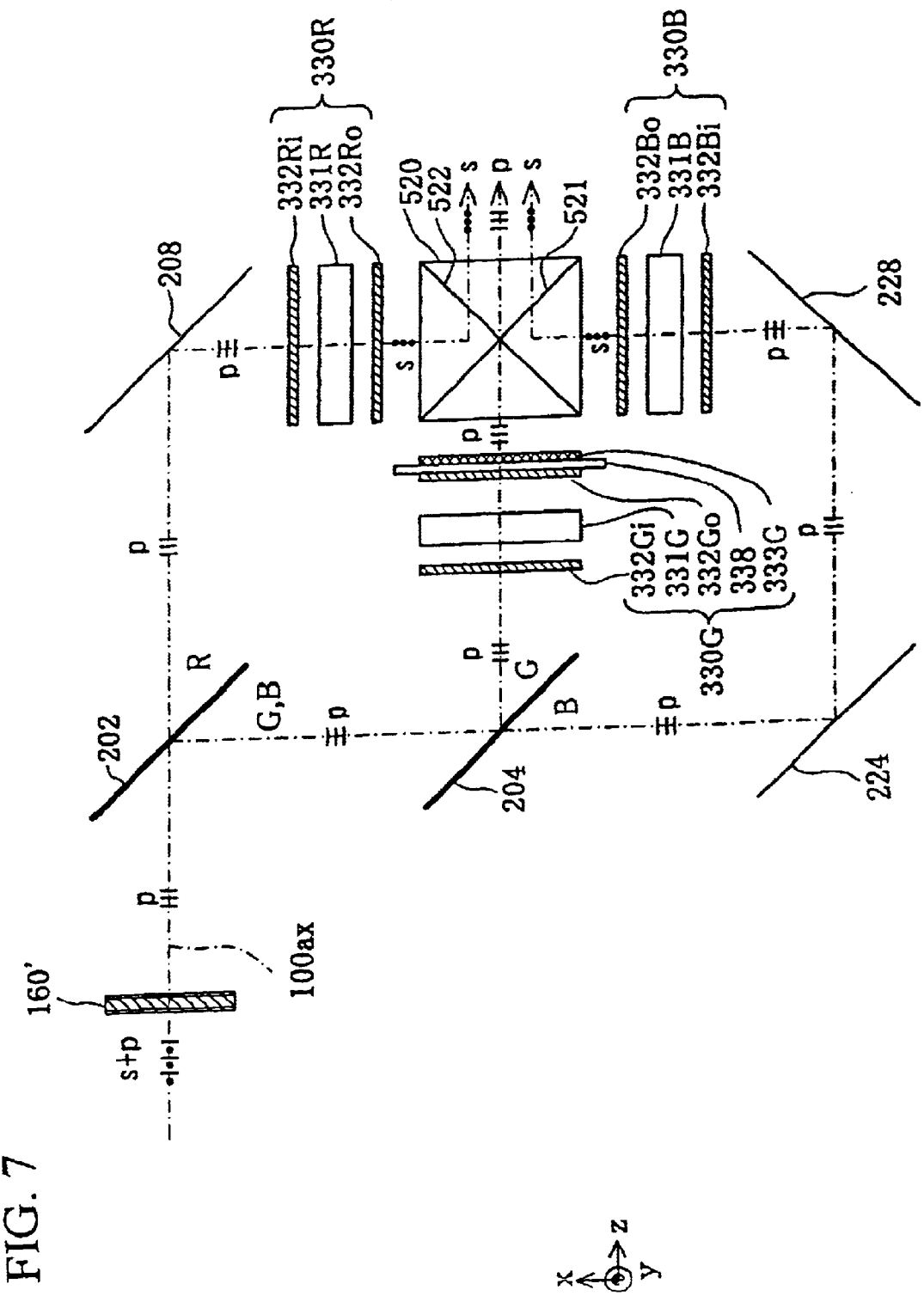
FIG. 7 is an explanatory diagram showing the main part of embodiment 4.
Figure 7A:
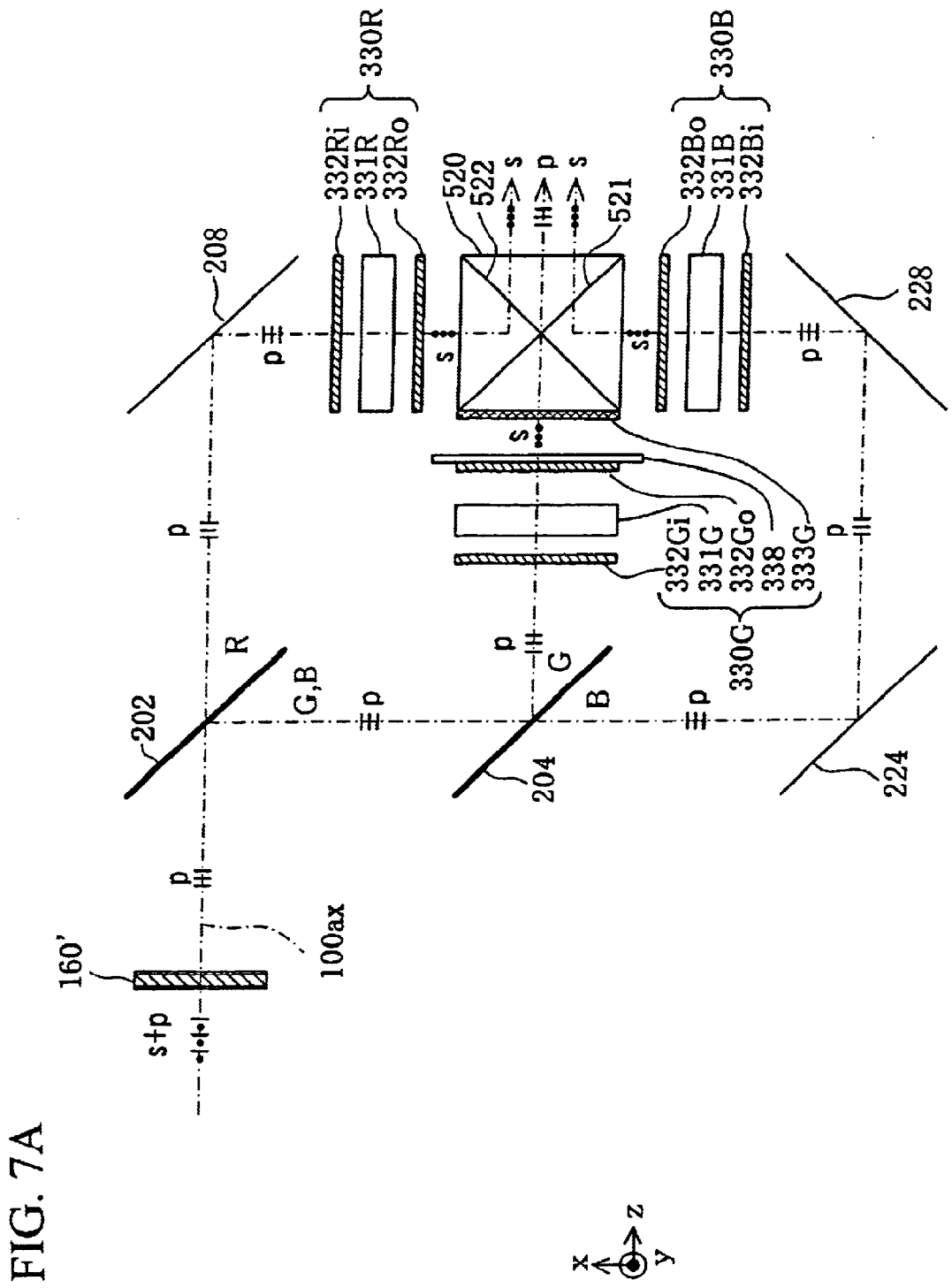
FIG. 7(A) is an explanatory diagram showing an alternate aspect of embodiment 4.

FIG. 7 is an explanatory diagram showing the main part of embodiment 4. In embodiment 3 (FIG. 6), the λ/2 retardation plate 323G is provided on the incident light side of the liquid crystal light valve 320G, but in embodiment 4, a λ/2 retardation plate 333G is provided on the light exit side of the liquid crystal light valve 330G. However, the second liquid crystal light valve 330G in embodiment 4 has a p-polarized light transmitting polarizing plate 332Gi provided on the incident light side and an s-polarized light transmitting polarizing plate 332Go provided on the light exit side.

In embodiment 4 also, as shown in FIG. 7, the λ/2 retardation plate 333G is provided with one surface open to the atmosphere and its other surface in contact with a transmissive glass plate 338 that does not change the direction of polarization. Therefore, the distortion of the λ/2 retardation plate 333G due to that of the polarizing plate 332Go can be reduced. As a result, it is possible to reduce the chrominance nonuniformities in the displayed color image.

In addition, in this embodiment, as with embodiment 2 (FIG. 5), it is possible to provide all p-polarized light transmitting polarizing plates 332Ri, 332Gi and 332Bi on the incident light sides of the three liquid crystal light valves 330R, 330G and 330B, and it is possible to provide s-polarized light transmitting polarizing plates 332Ro, 332Go and 332Bo on the light exit sides. The orientation of the liquid crystals of the liquid crystal panels 331R, 331G and 331B can be set identically. Therefore, in embodiment 4, the three liquid crystal light valves can be given a common design except for the λ/2 retardation plates so it is possible to reduce the number of types of parts. Moreover, in contrast to the case of embodiment 1, in this embodiment only one λ/2 retardation plate 333G is provided, so it has an advantage of being able to reduce the number of parts.

Note that the projector in this embodiment corresponds to the second electro-optical device of the claimed invention with a λ/2 retardation plate provided on the light exit side.

E. Embodiment 5

Figure 8:
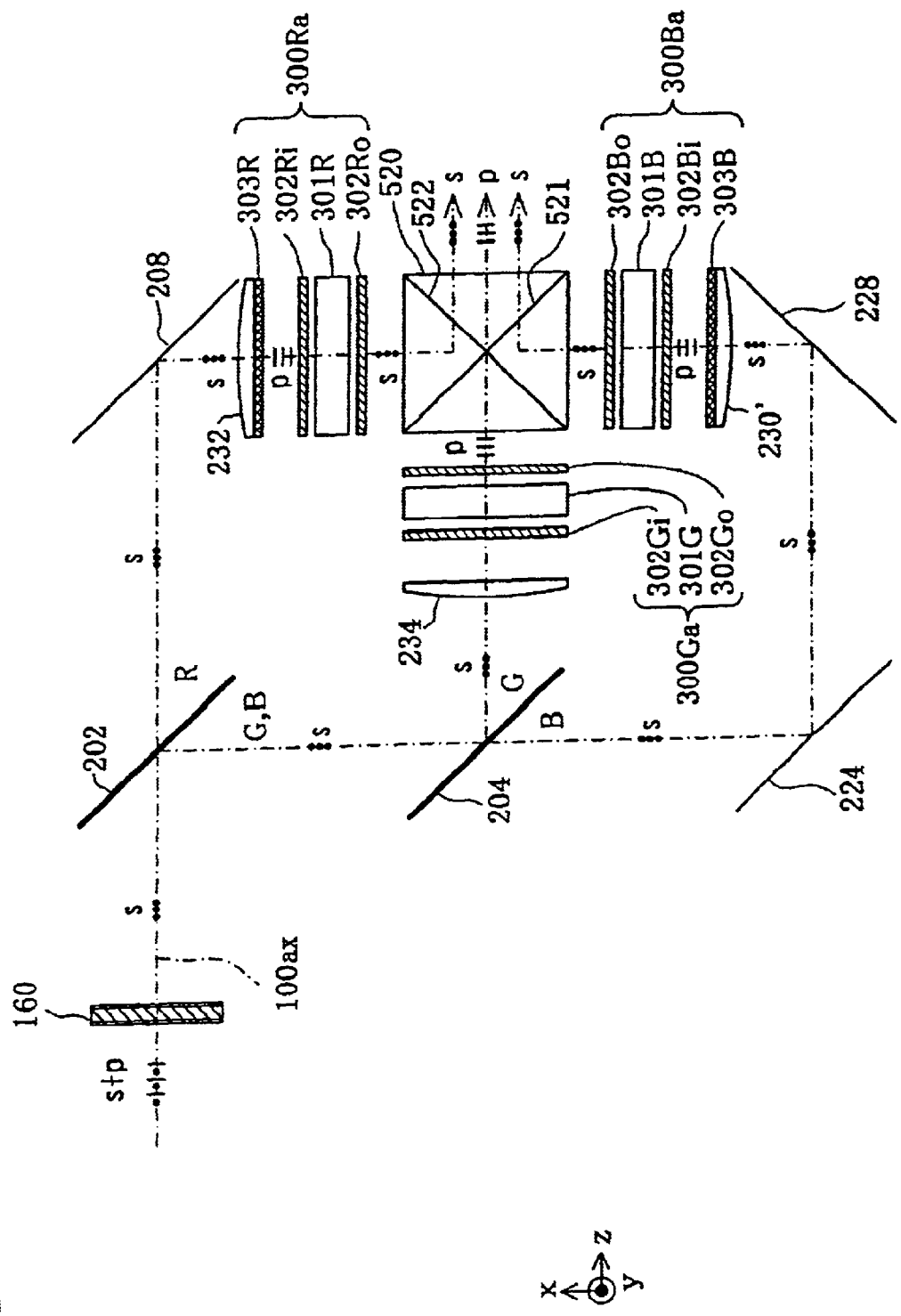
FIGS. 8 and 8(A) are explanatory diagrams showing the main part of embodiment 5.
Figure 8A:
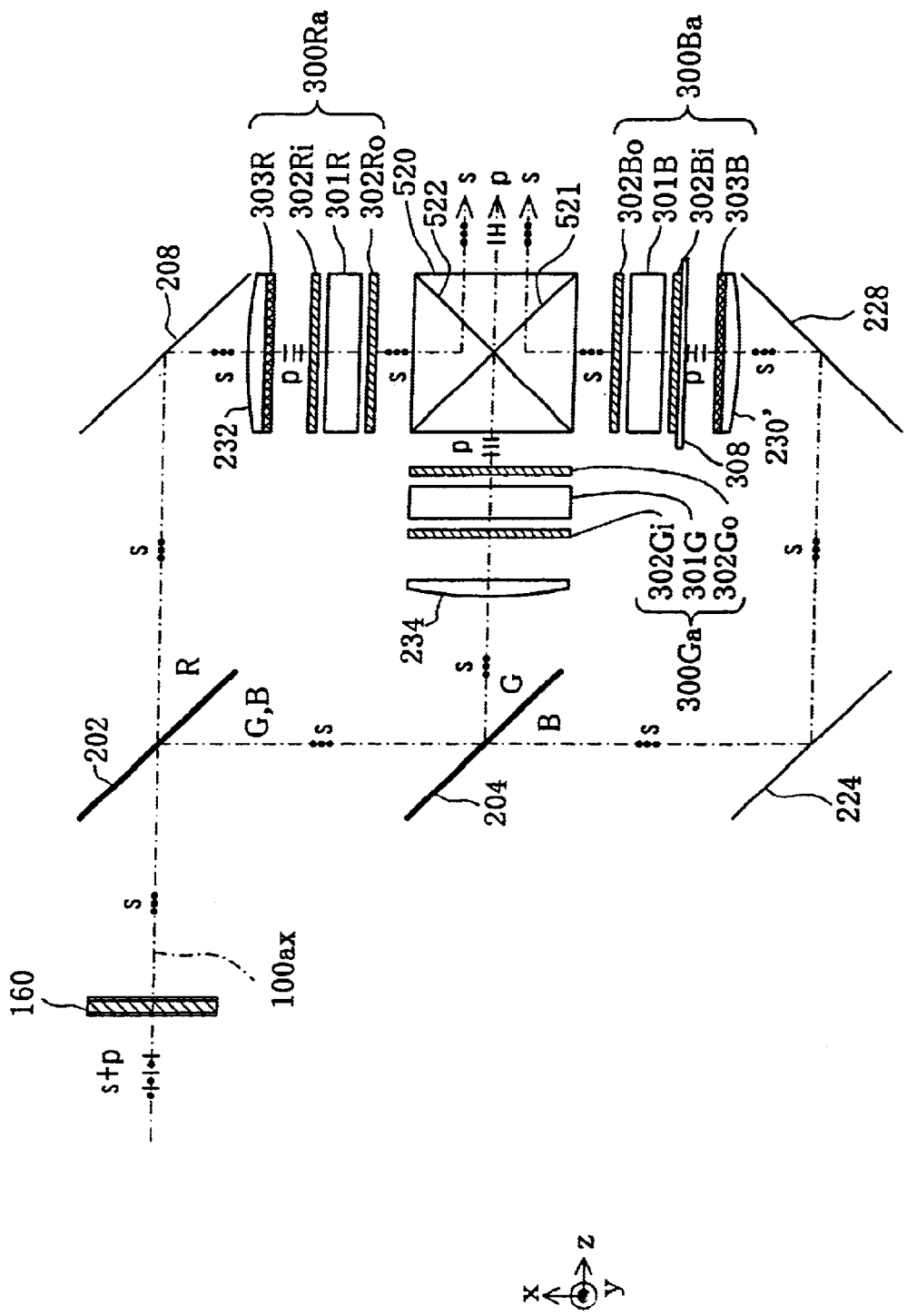

FIG. 8 is an explanatory diagram showing the main part of embodiment 5. Note that in FIG. 8, the three field lenses 232, 234 and 230' as shown in the projector 1000 of FIG. 1 are also shown. In embodiment 1 (FIG. 4), the λ/2 retardation plates 303R and 303B on the incident light side of the first and third liquid crystal light valves 300R and 300B are each affixed upon a glass plate 308, but in embodiment 5, they are affixed to the light exit side of field lenses 232 and 230' provided on the incident light sides of the first and third liquid crystal light valves 300Ra and 300Ba. For this reason, in this projector, a planoconvex field lens 230' is used instead of the double-convex field lens 230 of FIG. 1. If the λ/2 retardation plates 303R and 303B are affixed to the field lenses 232 and 230' in this manner, it is possible to omit the glass plate 308 used in embodiment 1 (FIG. 4).

In embodiment 5 also, the two λ/2 retardation plates 303R and 303G are provided with one surface open to the atmosphere and their other surface in contact with the field lenses 232 and 230' that do not change the direction of polarization. Therefore, in the same manner as in embodiment 1, it is possible to reduce the chrominance nonuniformities in the displayed color image. Note that this is similarly applicable to the projector of embodiment 3 shown in FIG. 6, and in this case, it is sufficient that the λ/2 retardation plate 323G of the liquid crystal light valve 320G be affixed to the field lens 234.

Note that the projector in this embodiment corresponds to the first and third electro-optical devices of the claimed invention with λ/2 retardation plates provided on the incident light side.

F. Embodiment 6

Figure 9:
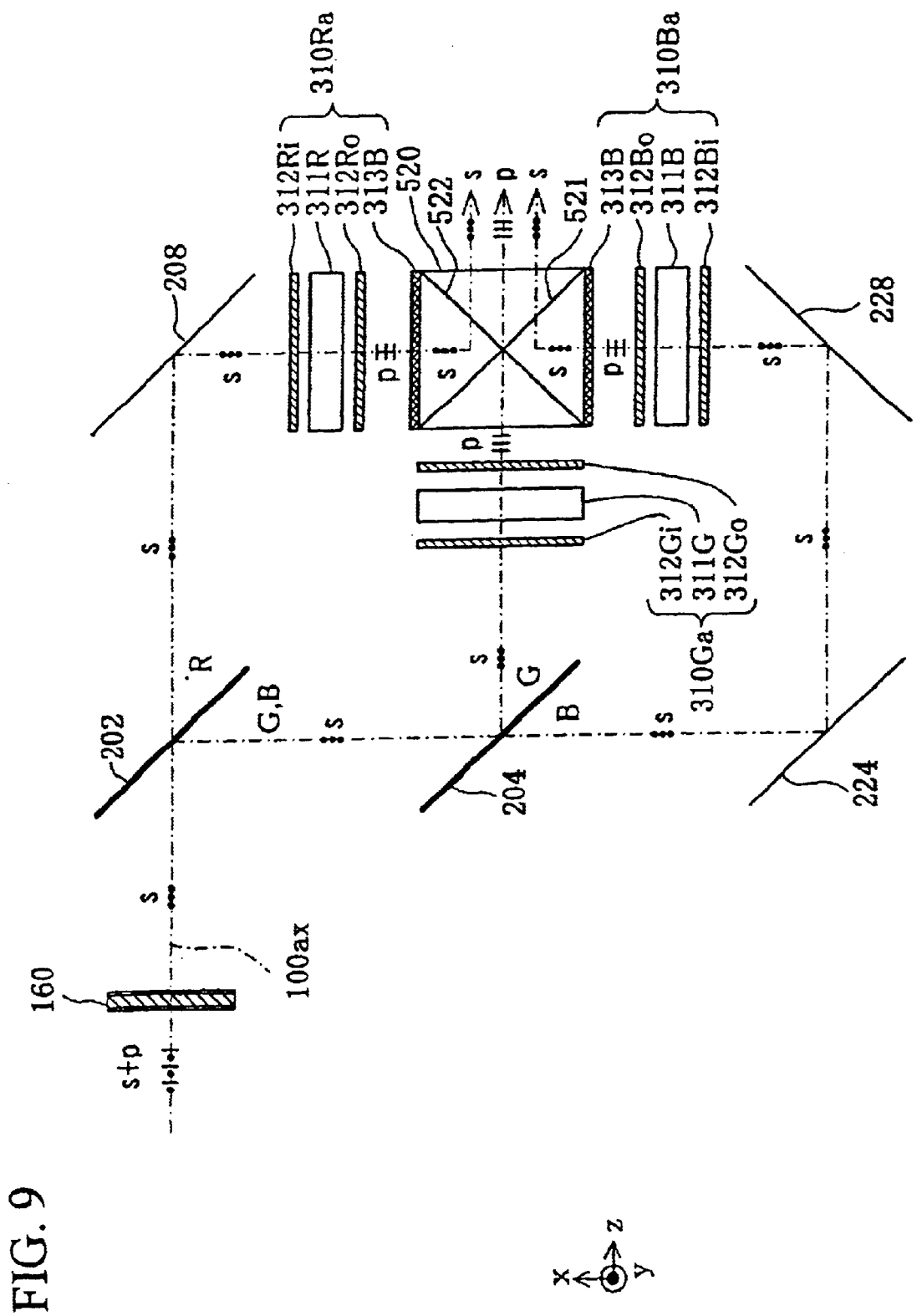
FIGS. 9 and 9(A) are explanatory diagrams showing the main part of embodiment 6.
Figure 9A:
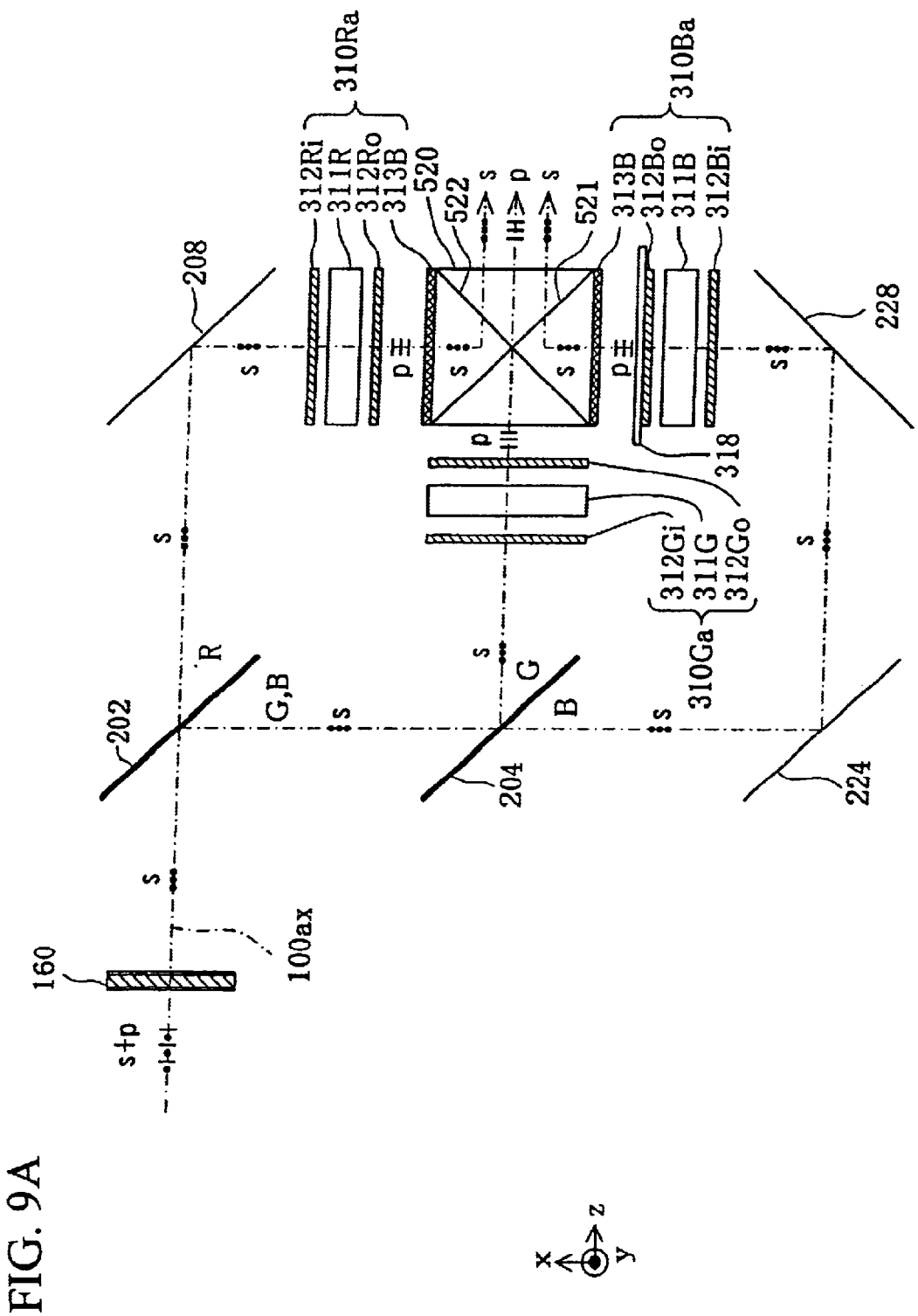

FIG. 9 is an explanatory diagram showing the main part of embodiment 6. In embodiment 2 (FIG. 5), the λ/2 retardation plates 313R and 313B on the light exit sides of the first and third liquid crystal light valves 310R and 310B are each affixed upon a glass plate 318, but in embodiment 6, they are affixed to the two incident light sides of the cross-dichroic prism 520 provided on the light exit sides of the first and third liquid crystal light valves 310Ra and 310Ba. In this case also, as in embodiment 5, it is possible to omit the glass plate 318 used in embodiment 2 (FIG. 5).

In embodiment 6 also, the two λ/2 retardation plates 313R and 313G are provided with one surface open to the atmosphere and their other surface in contact with the cross-dichroic prism 520 that does not change the direction of polarization. Therefore, in the same manner as in embodiment 2, it is possible to reduce the chrominance nonuniformities in the displayed color image. Note that this is similarly applicable to the projector of embodiment 4 shown in FIG. 7, and in this case, it is sufficient that the λ/2 retardation plate 333G of the second liquid crystal light valve 330G be affixed to the cross-dichroic prism 520.

Note that the projector in this embodiment corresponds to the first and third electro-optical devices of the claimed invention with λ/2 retardation plates provided on the light exit side.

As described above, in the projector according to the present invention, the λ/2 retardation plate is provided with one surface open to the atmosphere and its other surface in contact with a transmissive member that does not change the direction of polarization. By disposing the λ/2 retardation plate in this manner, the λ/2 retardation plate 303R will not distorted so much because of the distortion of the polarizing plate, so it is possible to reduce chrominance nonuniformities in the images displayed.

Note that this invention is in no way limited to the aforementioned working examples or embodiments, but rather various modifications are possible as long as they do not substantially deviate from it. For example, the following modifications are possible.

(1) In the aforementioned embodiments, the λ/2 retardation plate is provided together with a polarizing plate affixed to a glass plate, a cross-dichroic prism, field lens or other optical element, but the λ/2 retardation plate can also be provided independently. To wit, a λ/2 retardation plate simply affixed to a glass plate can be provided independently. In this case also, the λ/2 retardation plate is provided with one surface open to the atmosphere and its other surface in contact with a transmissive member that does not change the direction of polarization, so it is possible to reduce chrominance nonuniformities in the images displayed.

Note that a polarizing plate contained in a liquid crystal light valve may be affixed to a transmissive member to which a λ/2 retardation plate is affixed, as shown in FIGS. 4–7, or that may be affixed to another transmissive member different from the transmissive member to which the λ/2 retardation plate is affixed, as shown in FIGS. 8(A), 9(A), 6(A) and 7(A) (e.g., transmissive elements 308, 318, 328, and 338, respectively). In either case, the distortion of the λ/2 retardation plate can be reduced, so it is possible to reduce chrominance nonuniformities in the images displayed.

(2) In the aforementioned embodiments, the green beam of modulated light emitted from the second liquid crystal light valve is always made to be p-polarized light, and the red and blue beams of modulated light emitted from the first and third liquid crystal light valves are always made to be s-polarized light, but the colors of the light made to be p-polarized light or s-polarized light are not limited to these. For example, in FIG. 4, in the case wherein the positions of the two liquid crystal light valves 300G and 300B are exchanged and a green light-reflecting film is provided instead of the blue light-reflecting film 522, it is possible to make the red and green beams of modulated light be s-polarized light and the blue beam of modulated light be p-polarized light. Generally, it is sufficient for beams of modulated light having a first direction of polarization (s-polarized) to be emitted from the first and third liquid crystal light valves and beams of modulated light having a second direction of polarization (p-polarized) to be emitted from the second liquid crystal light valve.

(3) In the aforementioned embodiments, an illuminating optical system 100 that emits s-polarized light or p-polarized light is used, but in the case wherein polarizing plates are provided on the incident light sides of the liquid crystal light valves, the incident light may also be non-polarized light. By doing so, it is possible to omit the polarized light generating optical systems 160 and 160' provided on the illuminating optical system. In this case, it is sufficient to provide the λ/2 retardation plates on the light exit sides of the liquid crystal light valves. However, by adopting the configuration as in the aforementioned embodiments, the light incident on the polarizing plates on the incident light side can be utilized effectively, so it has the advantage that a bright image can be displayed on the screen SC.

In addition, when an illuminating optical system 100 that emits s-polarized light or p-polarized light is used as in the aforementioned embodiments, the polarizing plates provided on the incident light sides of the liquid crystal light valves may be omitted. To wit, since the polarizing plates provided on the incident light sides of the liquid crystal light valves are used to increase the degree of polarization of the illuminating light, they may be omitted if the degree of polarization of the light incident on the liquid crystal light valves is sufficiently high. In this case, it is sufficient to provide the λ/2 retardation plates and polarizing plates on the light exit sides of the liquid crystal light valves.

(4) In the aforementioned embodiments, λ/2 retardation plates are provided on the incident light sides or light exit sides of the liquid crystal light valves, but it is also possible to combine two λ/4 retardation plates to achieve the function of a single λ/2 retardation plate. For example, in the projector of embodiment 1 (FIG. 4), there may be provided a first λ/4 retardation plate instead of the λ/2 retardation plate 303R for the first liquid crystal light valve 300R, and also provided a second λ/4 retardation plate on the light exit side of the field lens 232 (FIG. 1). In this case also, it is preferable for the λ/4 retardation plate to be provided with one surface open to the atmosphere and its other surface in contact with a transmissive member that does not change the direction of polarization.

(5) In the aforementioned embodiments, a cross-dichroic prism 520 is used as the color combiner of the present invention, but this is not a limitation. As the color combiner it is possible to use the two light-reflecting films 521 and 522 contained in the cross-dichroic prism 520 but formed upon glass plates, for example. Generally, as the color combiner it is sufficient to use something that reflects the incident first and third beams of modulated light but transmits the second beam of modulated light, thereby combining the first through third beams of modulated light.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A projector for projecting and displaying a color image, comprising:

an illuminating optical system that emits illuminating light;

a color-separating optical system that separates said illuminating light emitted from said illuminating optical system into first through third beams of colored light, each of which has one of three color components;

first through third electro-optical devices that modulate said first through third beams of colored light separated by said color-separating optical system according to image information to form first through third beams of modulated light;

a color combiner that combines said first through third beams of modulated light to create a composite light by reflecting said first and third beams of modulated light while transmitting said second beam of modulated light;

a projecting optical system that projects the composite light emitted from said color combiner; and a $\lambda/2$ retardation plate provided on at least one of an incident side and an exit side of said first electro-optical device and another $\lambda/2$ retardation plate provided on at least one of an incident side and an exit side of said third electro-optical device, each of said $\lambda/2$ retardation plates having a first surface open to the atmosphere and a second surface in contact with a transmissive member.

2. The projector according to claim 1, wherein a direction of polarization of said first and third beams of modulated light incident on said color combiner is a first direction of polarization, while a direction of polarization of said second beam of modulated light is a second direction of polarization perpendicular to said first direction.

3. The projector according to claim 2, wherein said illuminating optical system comprises:

a polarized light generator for emitting said illuminating light as linearly polarized light having said first or second direction of polarization.

4. The projector according to claim 3, wherein said each of said $\lambda/2$ retardation plates is affixed to one surface of said transmissive member, and each of said first and third electro-optical devices includes a polarization plate affixed to another surface of said transmissive member.

5. The projector according to claim 3, wherein each of said $\lambda/2$ retardation plates is affixed to one surface of said transmissive member, and each of said first and third electro-optical devices includes a polarizing plate affixed to a second transmissive member other than said transmissive member to which each of said $\lambda/2$ retardation plates is affixed.

6. A projector for projecting and displaying a color image, comprising:

an illuminating optical system that emits illuminating light;

a color-separating optical system that separates said illuminating light emitted from said illuminating optical system into first through third beams of colored light, each of which has one of three color components;

first through third electro-optical devices that modulate said first through third beams of colored light separated by said color-separating optical system according to image information to form first through third beams of modulated light;

a color combiner that combines said first through third beams of modulated light to create a composite light by reflecting said first and third beams of modulated light while transmitting said second beam of modulated light;

a projecting optical system that projects the composite light emitted from said color combiner; and a $\lambda/2$ retardation plate provided on at least one of an incident side and an exit side of said second electro-optical device, said $\lambda/2$ retardation plate having a first surface open to the atmosphere and a second surface in contact with a transmissive member, wherein said $\lambda/2$ retardation plate is affixed to one surface of said transmissive member, and said second electro-optical device includes a polarizing plate affixed to another surface of said transmissive member.

7. The projector according to claim 6, wherein a direction of polarization of said first and third beams of modulated light incident on said color combiner is a first direction of polarization, while a direction of polarization of said second beam of modulated light is a second direction of polarization perpendicular to said first direction.

8. The projector according to claim 7, wherein said illuminating optical system comprises:

a polarized light generator for emitting said illuminating light as linearly polarized light having said first or second direction of polarization.

9. A projector for projecting and displaying a color image, comprising:

an illuminating optical system that emits illuminating light;

a color-separating optical system that separates said illuminating light emitted from said illuminating optical system into first through third beams of colored light, each of which has one of three color components;

first through third electro-optical devices that modulate said first through third beams of colored light separated by said color-separating optical system according to image information to form first through third beams of modulated light;

a color combiner that combines said first through third beams of modulated light to create composite light by reflecting said first and third beams of modulated light while transmitting said second beam of modulated light;

a projecting optical system that projects the composite light emitted from said color combiner; and a $\lambda/2$ retardation plate provided on at least one of an incident side and an exit side of said second electro-optical device, said $\lambda/2$ retardation plate having a first surface open to the atmosphere and a second surface in contact with a transmissive member, wherein said λ/2 retardation plate is affixed to one surface of said transmissive member, and said second electro-optical device includes a polarizing plate affixed to a second transmissive member other than said transmissive member to which said λ/2 retardation plate is affixed.

10. The projector according to claim 9, wherein a direction of polarization of said first and third beams of modulated light incident on said color combiner is a first direction of polarization, while a direction of polarization of said second beam of modulated light is a second direction of polarization perpendicular to said first direction.

11. The projector according to claim 9, wherein said illuminating optical system comprises:

a polarized light generator for emitting said illuminating light as linearly polarized light having said first or second direction of polarization.

* * * * *